United States Patent
Atawia et al.

(10) Patent No.: US 12,231,371 B2
(45) Date of Patent: Feb. 18, 2025

(54) INTERFERENCE AVOIDANCE FOR CELLULAR NETWORKS

(71) Applicant: Dell Products, L.P., Round Rock, TX (US)

(72) Inventors: Ramy Atawia, Kanata (CA); Marwan Mansour, Alexandria (EG); Omar Gad, London (GB); Mariam Basili, Cairo (EG)

(73) Assignee: Dell Products, L.P., Round Rock, TX (US)

( * ) Notice: Subject to any disclaimer, the term of this patent is extended or adjusted under 35 U.S.C. 154(b) by 389 days.

(21) Appl. No.: 17/659,248

(22) Filed: Apr. 14, 2022

(65) Prior Publication Data

US 2023/0336318 A1 Oct. 19, 2023

(51) Int. Cl.
*H04L 5/00* (2006.01)
*H04L 1/1607* (2023.01)
*H04L 1/1812* (2023.01)

(52) U.S. Cl.
CPC .......... *H04L 5/0073* (2013.01); *H04L 1/1678* (2013.01); *H04L 1/1812* (2013.01); *H04L 5/0055* (2013.01); *H04L 5/0064* (2013.01)

(58) Field of Classification Search
None
See application file for complete search history.

(56) References Cited

U.S. PATENT DOCUMENTS

| | | | |
|---|---|---|---|
| 2017/0202005 A1* | 7/2017 | Madan | H04W 72/542 |
| 2017/0346750 A1* | 11/2017 | Wang | H04L 47/27 |
| 2020/0187222 A1 | 6/2020 | Rao et al. | |
| 2021/0051522 A1 | 2/2021 | Zhou et al. | |
| 2023/0171738 A1* | 6/2023 | Di Girolamo | H04W 72/20 370/329 |
| 2023/0209370 A1* | 6/2023 | Pateromichelakis | G06N 20/00 370/328 |

FOREIGN PATENT DOCUMENTS

| | | |
|---|---|---|
| WO | 2021/249637 A1 | 12/2021 |
| WO | 2021/249638 | 12/2021 |
| WO | 2022/167364 | 8/2022 |

OTHER PUBLICATIONS

"O-RAN Working Group 3 Near-Real-time RAN Intelligent Controller E2 Service Model (E2SM), RAN Control," Technical Specification, ORAN.WG3.E2SM-RC-v01.01.00, 267 pages.

(Continued)

*Primary Examiner* — Saad Khawar
(74) *Attorney, Agent, or Firm* — Amin, Turocy & Watson, LLP

(57) ABSTRACT

The described technology is generally directed towards interference avoidance for cellular networks. A controller can estimate intercell interference and provide recommendations of preferred time slots that can be used by cell schedulers to avoid intercell interference. The controller can leverage sporadic traffic of neighboring cells by identifying time slots at which traffic demand likely to result in intercell interference. The controller can then guide schedulers at cells to send data in a manner that mitigates intercell interference.

20 Claims, 14 Drawing Sheets

1902
Receiving user equipment feedback comprising indications of previous successful and unsuccessful transmissions to a first user equipment via a network node and time information associated with the previous successful and unsuccessful transmissions to the first user equipment via the network node.

1904
Determining, based on the user equipment feedback, time recommendations for timing of future transmissions to a second user equipment via the network node.

1906
Sending the time recommendations to the network node.

(56) References Cited

OTHER PUBLICATIONS

International Search Report and Written Opinion received for PCT Application Serial No. PCT/US2022/053276 dated Mar. 27, 2023, 13 pages.
"O-RAN Operations and Maintenance Architecture" O-RAN.WG1.OAM-Architecture-v04.00, 2021, 55 pages.
International Search Report and Written Opinion mailed Feb. 20, 2024 for PCT Application No. PCT/US2023/036175, 15 pages.
Gad et al. "Adaptive Intercell Interference Avoidance Feedback-Decision Window" U.S. Appl. No. 18/313,413, filed May 8, 2023, 48 pages.
"O-RAN Working Group 3 Near-Real-time RAN Intelligent Controller E2 Service Model (E2SM), RAN Control," Technical Specification, ORAN.WG3.E2SM-RC-v01.01.00, 2020, 267 pages.
International Preliminary Report on Patentability for PCT Application Serial No. PCT/US2022/053276 dated Oct. 24, 2024, 8 pages.
European Office Action mailed Nov. 21, 2024 for European Patent Application No. 22851202.6, 3 pages.

\* cited by examiner

| Network conditions (RSRP and RSRQ) | Expected MCS Index |
|---|---|
| $(RSRP_1, RSRQ_1)$ | $mcs_1$ |
| $(RSRP_2, RSRQ_2)$ | $mcs_2$ |
| ... | ... |

| Action (Slot Pattern) | Network state (RSRP, RSRQ) | Reward (cell throughput) |
|---|---|---|
| $S_1 = [0,0,1,1,1]$ | $(RSRP_1, RSRQ_1)$ | $R_{1,1}$ |
| $S_1 = [0,0,1,1,1]$ | $(RSRP_2, RSRQ_2)$ | $R_{1,2}$ |
| $S_1 = [0,0,1,1,1]$ | ... | ... |
| $S_1 = [0,0,1,1,1]$ | $(RSRP_n, RSRQ_n)$ | $R_{1,n}$ |
| ... | ... | ... |
| $S_m = [1,0,0,0,1]$ | $(RSRP_n, RSRQ_n)$ | $R_{m,n}$ |

| UE IDs | Nearby Cell IDs (ANR) |
|---|---|
| $UE_1$ | [1,3,4] |
| $UE_2$ | [5,6,7] |
| ... | ... |
| $UE_m$ | [X,Y,Z] |

FIG. 15

| Measured (PRB Utilization per cell) | Recommended Action (PRB Utilization per cell) |
|---|---|
| $C_1$ = [100,50, 50,0,0]<br>$C_2$ = [100,50, 50,0,0]<br>$C_x$ = [100,50, 0,0,100] | $C_1$ = [100,50,50,0,0]<br>$C_2$ = [0,50,50,100,0]<br>$C_x$ = [0,50,0,0,100] |
| $C_{1b}$ = [100,50,50,0,0]<br>$C_{2b}$ = [100,50,50,100,0]<br>$C_{xb}$ = [0,50,0,0,100] | $C_{1b}$ = [100,50,50,0,0]<br>$C_{2b}$ = [0,50,50,100,0]<br>$C_{xb}$ = [0,50,0,0,100] |
| ... | ... |
| $C_{1m}$ = [100,50,50,0,0]<br>$C_{2m}$ = [0,50,50,100,0]<br>$C_{xm}$ = [0,50,0,0,100] | $C_{1m}$ = [100,50,50,0,0]<br>$C_{2m}$ = [0,50,50,100,0]<br>$C_{xm}$ = [0,50,0,0,100] |

FIG. 16

INTERFERENCE AVOIDANCE FOR CELLULAR NETWORKS

BACKGROUND

In a typical radio access network (RAN) deployment, whether fourth generation (4G) or fifth generation (5G), the same spectrum (i.e. frequency channel) is reused for all the cells to achieve network-wide coverage under the limited spectrum purchased by the operator. However, user equipment (UEs) connected to cells will suffer from inter-cell interference when neighboring cells are transmitting simultaneously. Such interference can result in low network key performance indicators (KPIs), e.g., low spectral efficiency and low quality of service (QoS).

The impact of inter-cell interference depends on UE locations relative to their serving cells, as well as the interfering neighbor cells. As such, inter-cell interference mitigation techniques try to identify impacted UEs and select the spectrum resources that can be used by each cell.

In a null beamforming approach, cells identify the direction of a UE, and shape beams such that a "main beam" is directed towards served UEs, while "beam nulls" are directed towards UEs served by neighboring cells to avoid interference. Such beamforming depends on the hardware capability of the deployed radios, and the channel estimation capability of the UEs. Both require high cost and computational power in the cell and the UE. In addition, the performance is sensitive to the dynamics in the wireless channels which limit usability in high mobility cases or in urban areas with multipath transmissions, resulting in suboptimal directional estimation. Furthermore, cells exchange information such as UE locations in the beamforming stage, which is not always valid in the case of multi-vendor deployments.

In a sub-band channel quality indictor (CQI) approach, a UE reports channel quality in each part of the spectrum (e.g., each resource block group). A scheduler then selects the resource block groups with highest channel quality for each UE. A challenge, however, is that the reported quality is averaged over time durations which depend on UE implementations. In addition, scattering the UE data transmission over multiple time slots (since only a small part of the spectrum is used), can result in excessive usage of control channels.

In a channel reuse approach, frequency can be reused between different cells such that static non-overlapping parts of the spectrum are allocated to neighboring cells. This, however, results in low spectral efficiency when the traffic load is not uniformly distributed across the neighboring cells. Furthermore, reconfiguring the spectrum allocation to each cell can result in service interruptions to connected users.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 15 illustrates an example controller input based on automatic neighbor relations (ANR), in accordance with various aspects and embodiments of the subject disclosure.

FIG. 16 illustrates example measured PRB utilization and recommended actions from a controller, in accordance with various aspects and embodiments of the subject disclosure.

DETAILED DESCRIPTION

Figure 1:
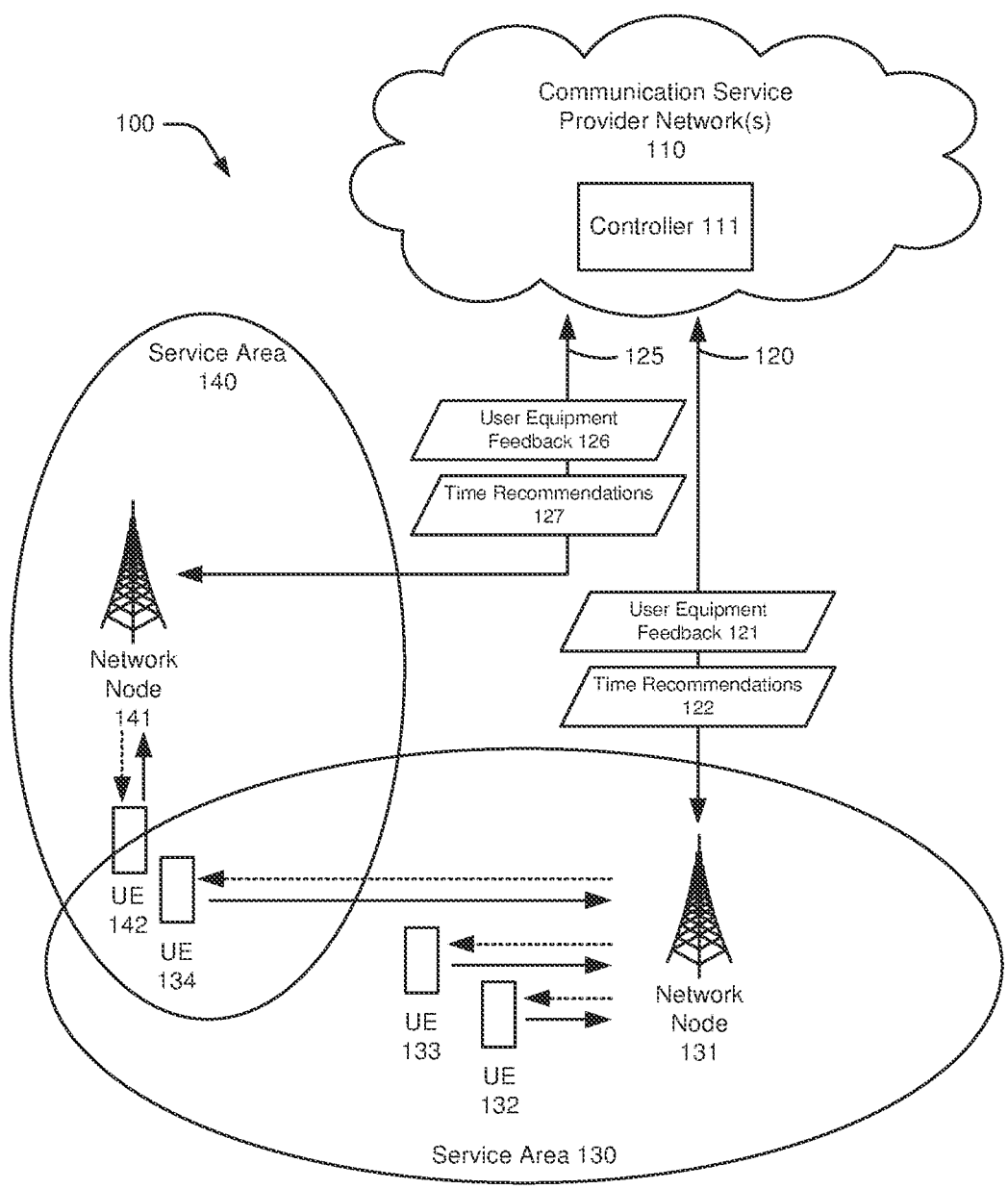
FIG. 1 illustrates an example wireless communication system configured to estimate intercell interference and provide recommendations of preferred time slots that can be used at network nodes to avoid intercell interference, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards interference avoidance for cellular networks. A controller can estimate intercell interference and provide recommendations of preferred time slots that can be used by cell schedulers to avoid intercell interference. The controller can leverage sporadic traffic of neighboring cells by identifying time slots at which traffic demand likely to result in intercell interference. The controller can then guide schedulers at cells to send data in a manner that mitigates intercell interference. Further aspects and embodiments of this disclosure are described in detail below.

FIG. 1 illustrates an example wireless communication system configured to estimate intercell interference and provide recommendations of preferred time slots that can be used at network nodes to avoid intercell interference, in accordance with various aspects and embodiments of the subject disclosure. The example wireless communication system 100 includes network nodes 131, 141 of a radio access network (RAN). The network nodes 131, 141 provide wireless communication service in service areas 130, 140. User equipment (UE) in the service area 130, such as UE 132, UE 133, and UE 134, can send and receive communications via network node 131. UE 142 in the service area 140 can send and receive communications via network node 141.

The network nodes 131, 141 can communicate with communication service provider network(s) 110 via backhaul links 120, 125. The communication service provider network(s) 110 can include a variety of network equipment, including, e.g., a controller 111. In some embodiments, the controller 111 be configured to receive user equipment feedback 121, 126 from network nodes 131, 141, and to generate time recommendations 122, 127 to be applied at the network nodes 131, 141, wherein the time recommendations 122, 127 comprise, e.g., preferred time slots for transmissions network nodes 131, 141 which avoid intercell interference between the network nodes 131, 141.

The non-limiting term "user equipment" can refer to any type of device that can communicate with network nodes 131, 141 in a cellular or mobile communication system 100. UEs 132, 133, 134, 142 can have one or more antenna panels having vertical and horizontal elements. Examples of UEs 132, 133, 134, 142 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 132, 133, 134, 142 can also comprise IOT devices that communicate wirelessly.

In various embodiments, system 100 comprises communication service provider network(s) 110 serviced by one or more wireless communication network providers. Communication service provider network(s) 110 can comprise a "core network". In example embodiments, UEs 132, 133, 134, 142 can be communicatively coupled to the communication service provider network(s) 110 via network nodes 131, 141. The network nodes 131, 141 (e.g., network node devices) can communicate with UEs 132, 133, 134, 142, thus providing connectivity between the UEs 132, 133, 134, 142 and the wider cellular network. The UEs 132, 133, 134, 142 can send transmission type recommendation data to the network nodes 131, 141. The transmission type recommendation data can comprise a recommendation to transmit data via a closed loop multiple input multiple output (MIMO) mode and/or a rank-1 precoder mode.

Network nodes 131, 141 can each have a cabinet, other protected enclosures, computing devices, an antenna mast, and multiple antennas for performing various transmission operations (e.g., MIMO operations) and for directing/steering signal beams. Network nodes 131, 141 can each comprise one or more base station devices which implement features of the network node. Network nodes can serve several cells, depending on the configuration and type of antenna. In example embodiments, UEs 132, 133, 134, 142 can send and/or receive communication data via wireless links to the network nodes 131, 141. The dashed arrow lines from the network nodes 131, 141 to the UEs 132, 133, 134, 142 represent downlink (DL) communications to the UEs 132, 133, 134, 142. The solid arrow lines from the UEs 132, 133, 134, 142 to the network nodes 131, 141 represent uplink (UL) communications.

Communication service provider networks 110 can facilitate providing wireless communication services to UEs 132, 133, 134, 142 via the network nodes 131, 141 and/or various additional network devices (not shown) included in the one or more communication service provider networks 110. The one or more communication service provider networks 110 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 110 can be or comprise the wireless communication network and/or various additional devices and components of the wireless communication network (e.g., additional network devices and cell, additional UEs, network server devices, etc.).

The network nodes 131, 141 can be connected to the one or more communication service provider networks 110 via one or more backhaul links 120, 125. For example, the one or more backhaul links 120, 125 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 120, 125 can also comprise wireless link components, such as but not limited to, line-of-sight (LOS) or non-LOS links which can comprise terrestrial air-interfaces or deep space links (e.g., satellite communication links for navigation). Backhaul links 120, 125 can be implemented via a "transport network" in some embodiments. In another embodiment, network nodes 131, 141 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UEs 132, 133, 134, 142 and the network nodes 131, 141). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 132, 133, 134, 142 and the network nodes 131, 141) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

In an example embodiment according to FIG. 1, the controller 111 can be adapted to estimate the intercell interference over a smallest time granularity, i.e., a single transmission time interval (TTI), and the controller 111 can provide time recommendations 122, 127 regarding preferred time slots that can be used by schedulers at cells (e.g., schedulers at network nodes 131, 141) to avoid inter-cell interference. The controller 111 can leverage the sporadic traffic of the neighboring cells at network nodes 131, 141 and the controller 111 can identify the time slots at which peak traffic demand is transmitted over the air. The controller 111 can then then guide the resource schedulers at network nodes 131, 141 to avoid sending data over the air to some of UEs 132, 133, 134, 142 which may experience high interference.

In some embodiments, the controller 111 can utilize low overhead and high granularity standard compliant data. The controller 111 can be adapted to rely on network data that is readily available at schedulers as part of medium access control (MAC) layer feedback procedures defined in 3GPP. Thus, extra information from the UEs 132, 133, 134, 142 or the schedulers at network nodes 131, 141 need not be necessary, which in turn reduces implementation cost and signaling overhead.

Furthermore, the controller 111 can rely on data with multiple granularities, including TTI-level information and/or aggregated network performance metrics. This allows the controller 111 to strike a balance between accuracy and computation overhead. In particular, when the controller 111 is connected to schedulers with low memory, limited processing capabilities, or which are highly utilized during high load conditions (e.g. peak hours), aggregated network performance metrics such as reference signal received quality (RSRQ) and average modulation and coding scheme (MCS) can be used to detect intercell interference and guide the controller 111 to select other time slots for time recommendations 122, 127. On the other hand, TTI-level information can allow the controller 111 to have an explicit view of neighboring cell traffic and resultant interference patterns, and the controller 111 can build an accurate preferred slot list.

Moreover, the controller 111 need not require additional reconfigurations of the UEs 132, 133, 134, 142 or cells/network nodes 131, 141 after recalculating time recommendations 122, 127. The controller 111 can thus reduce signaling overhead and service interruptions.

In some embodiments, the controller 111 can comprise multivendor deployment support. The controller 111 can rely on learning and prediction to estimate interference profiles for each UE 132, 133, 134, 142 when the explicit traffic patterns and interference profiles of neighboring cells is not available. This is useful when the controller 111 is managing a subset of cells in a network.

In some embodiments, the controller 111 can be adapted for spatiotemporal UE awareness. The time recommendations 122, 127 can comprise preferred lists (of preferred time slots) to avoid intercell interference which can be built for each UE 132, 133, 134, 142. This results in high spectral efficiency and resource utilization when UEs 132, 133, 134, 142 are exposed to different sources of interference based on location, network topology and capabilities. Furthermore, this allows the schedulers at network nodes 131, 141 to allocate radio resources to UEs 132, 133, 134, 142 when the UEs 132, 133, 134, 142 are not expected to receive interference from the neighboring cells. The time slots with high intercell interference can be allocated to UEs 132, 133, 134, 142 that are very close to cell centers and typically experience high signal to interference and noise ratios (SINR).

In some embodiments, the controller 111 can be adapted for proactive QoS aware optimization. Preferred time slots in time recommendations 122, 127 can be updated at faster pace (e.g. at 100 ms intervals), compared to static frequency reuse, resulting in higher spectral efficiency. In addition, such fast adaptation captures network dynamics due to user mobility or unexpected changes in the neighboring cell traffic profiles.

Furthermore, the controller 111 can utilize historical information, collected from previously connected UEs at similar network conditions. The controller 111 can use historical information to recommend preferred slots to new UEs. The time recommendations 122, 127 can proactively avoid slots with high interference; resulting in higher QoS satisfaction that can be useful for ultra-reliable low latency communication (URLLC) traffic and high spectrum efficiency for enhanced mobile broadband (eMBB) traffic.

Moreover, the controller 111 and schedulers at network nodes 131, 141 can consider QoS levels for UEs 132, 133, 134, 142 while employing time recommendations 122, 127 including preferred slots to avoid QoS violations for UEs 132, 133, 134, 142 requesting traffic with stringent delay requirements. For instance, schedulers can assess the risk of QoS violation (e.g. packet exceeds its delay budget due to delaying the transmission to a preferred slot) and can compare that to the risk of transmitting the packet immediately in a non-preferred slot which results in packet drops due to high interference.

Embodiments according to this disclosure can include, inter alia, five different example embodiments. In a first example embodiment, the controller 111 can be connected to one cell, or a subset of interfering neighboring cells, the controller can be adapted to utilize user equipment feedback 121, 126, comprising hybrid automatic repeat request (HARQ) feedback on each slot over a window of a defined duration, e.g., X ms. The HARQ feedback can be originally transmitted by the UEs 132, 133, 134, 142 to the serving cells/network nodes 131, 141 hosting the schedulers, and the controller 111 can send time recommendations 122, 127 comprising lists of time slots that the schedulers can use to avoid interference.

In a second example embodiment, the traffic of neighboring cells can be more dynamic and thus the HARQ feedback list can change over each time window. Thus, the controller 111 can be configured to keep a history of HARQ feedback received in previous measurements, and the controller 111 can use the history to calculate a score for each time slot. The score can indicate how much interference is expected in a slot. The schedulers can be adapted to determine whether a slot shall be used or not, based on QoS.

A third example embodiment can rely on 3GPP defined KPIs such as reference signal received power (RSRP), RSRQ, and the MCS to identify whether intercell interference is a cause of performance degradation. The controller 111 can evaluate a set of potential slot patterns under different network conditions, and the controller 111 can record reward values that reflect how optimal a slot pattern is for each network condition. The architecture in this embodiment can utilize the O-RAN architecture Radio Intelligent Controller (RIC) for the controller 111 design, which can be also utilized in multivendor deployments.

In a fourth example embodiment, the controller 111 can be connected to neighboring and interfering cells in a network. The controller 111 can utilize the physical resource block (PRB) utilization of each cell as well as neighboring cell data from automatic neighbor relations (ANR) to detect interfering cells and generate time recommendations 122, 127 comprising recommended slot utilization lists that can be used by each cell.

A fifth example embodiment can be a variant of the third embodiment, where interference is detected using machine learning instead of rule-based comparisons. A machine learning model can be trained in a non-real time RIC on RSRP, RSRQ and MCS data generated from simulations and drive tests; then the trained model can be passed to a near-real time RIC for runtime inference of interference and potential time slots to be utilized.

Figure 2:
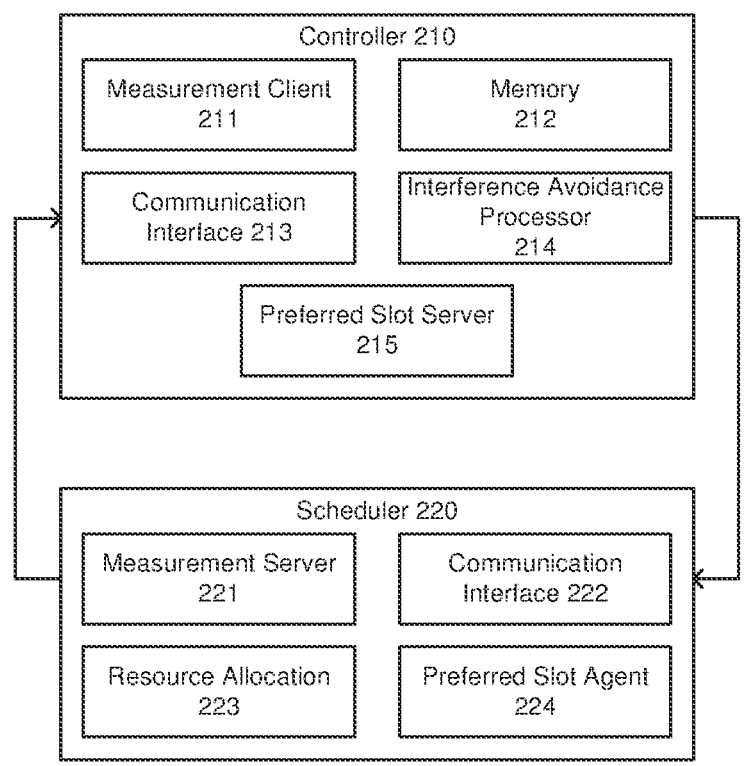
FIG. 2 illustrates an example architecture of a controller and scheduler, in accordance with various aspects and embodiments of the subject disclosure.

FIG. 2 illustrates an example architecture of a controller and scheduler, in accordance with various aspects and embodiments of the subject disclosure. FIG. 2 includes an example controller 210 and an example scheduler 220. The controller 210 can implement the controller 111 introduced in FIG. 1 and the scheduler 220 can implement schedulers at the network nodes 131, 141 introduced in FIG. 1. The controller 210 includes a measurement client 211, a memory 212, a communication interface 213, an interference avoidance processor 214, and a preferred slot server 215. The scheduler 220 comprises a measurement server 221, a communication interface 222, a resource allocator 223 and a preferred slot agent 224.

The controller 210 can optionally be implemented in communication service provider network(s) 110 as illustrated in FIG. 1, or in RAN nodes, e.g. within a central unit (CU), a distributed unit (DU), or a radio unit (RU) of a disaggregated RAN. In some embodiments, the controller 210 can be implemented in the same hardware as a DU comprising the scheduler 220, or the controller 210 can be implemented in a different machine such as a remote server or cloud resource.

The controller 210 can be responsible for collecting interference related measurements and proposing time recommendations, e.g., a set of preferred time slots, to the scheduler 220. The communication interface 213 can be configured to enable exchange of input/output information with the scheduler 220. The measurement client 211 can be configured to specify information to be collected from the scheduler 220, as well as how the information is to be collected (e.g. periodically or on demand). The memory can be configured to store the input measurements, previous decisions and user/cell information. The interference avoidance processor 214 can be configured to use recent measurements and stored information to compute preferred slots for each UE, such that intercell interference is minimized. The preferred slot server 215 can be configured to send the processed data to the scheduler 220 in a predefined format.

The scheduler 220 can be implemented, e.g., exists in a DU or other element of a RAN. In addition to its primary task of allocating spectrum resources to UEs for every time slot, the scheduler 220 can be configured to report network measurements to the controller 210 and read and apply preferred slot recommendations from the controller 210. The communication interface 222 can be configured to enable exchange of input/output information with the controller 210. The measurement server 221 can be configured to receive an information request from the controller, which requests information to be collected, and to collect such information accordingly. The information request can also specify the collection method (e.g. periodically or on demand). The preferred slot agent 224 can be configured to receive a list of preferred slots for each UE and can process the preferred slots as an input to the resource allocation 223. The resource allocation 223 can be configured to consider the preferred slots on top of existing processes that consider UE priority and QoS levels.

Figure 3:
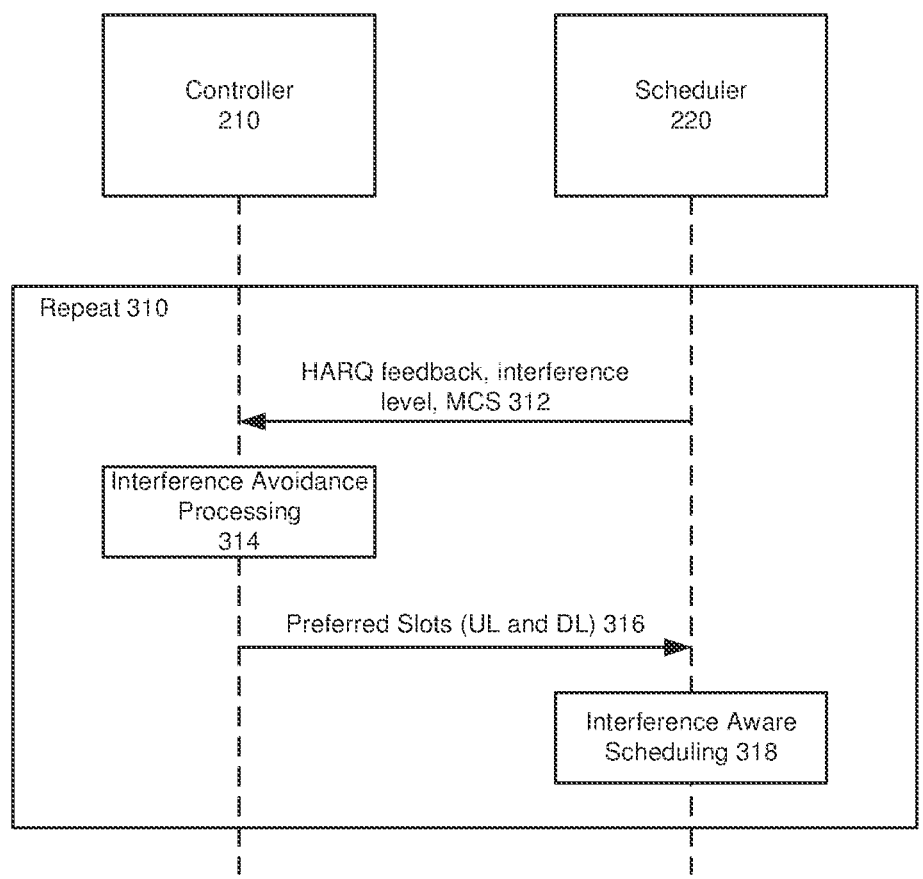
FIG. 3 is a signal diagram illustrating example interactions of the controller and scheduler introduced in FIG. 2, in accordance with various aspects and embodiments of the subject disclosure.

FIG. 3 is a signal diagram illustrating example interactions of the controller and scheduler introduced in FIG. 2, in accordance with various aspects and embodiments of the subject disclosure. FIG. 3 includes the controller 210 and the scheduler 220. Example interactions between the controller 210 and the scheduler 220 include the repeating interactions 310. The scheduler 220 can provide HARQ feedback, interference level, and MCS data 312 to the controller 210. The controller 210 can use the received data 312 to conduct interference avoidance processing 314. The controller 210 can provide time recommendations including preferred slots (UL and DL) 316 to the scheduler 220. The scheduler 220 can use the preferred slots (UL and DL) 316 to perform interference aware scheduling 318.

Figure 4:
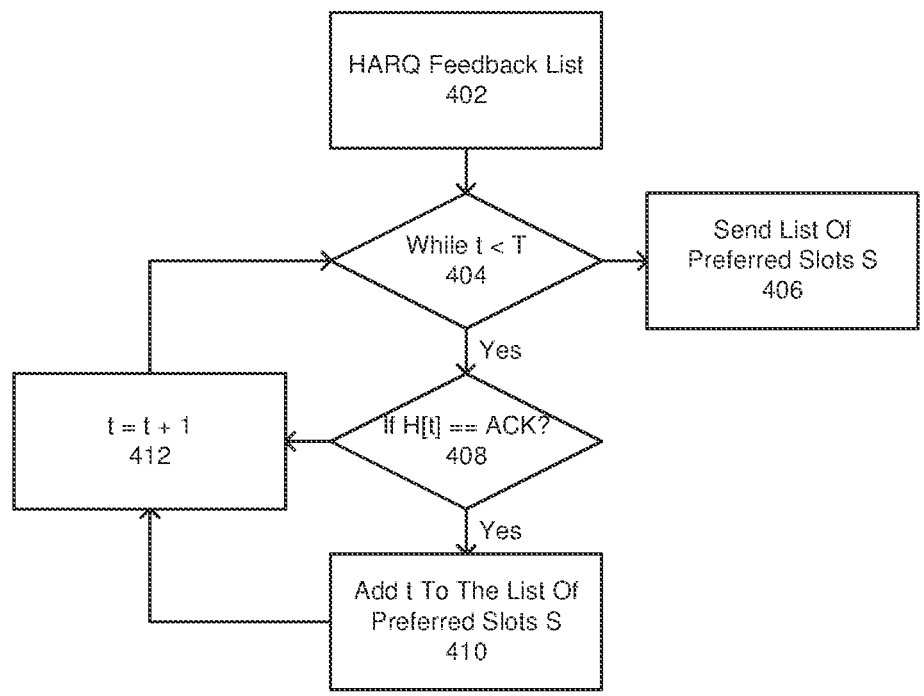
FIG. 4 is a flow diagram illustrating example processing operations that can be performed by a controller in accordance with the first embodiment introduced herein, in accordance with various aspects and embodiments of the subject disclosure.
Figure 5:
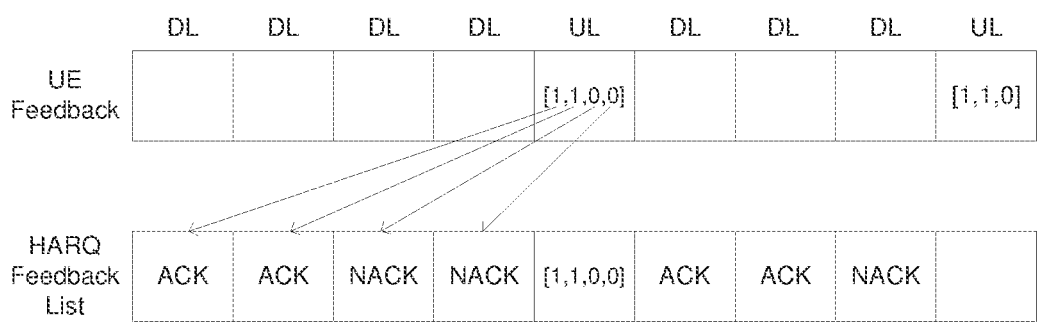
FIG. 5 illustrates an example HARQ feedback list, in accordance with various aspects and embodiments of the subject disclosure.

FIG. 4 is a flow diagram illustrating example processing operations that can be performed by a controller in accordance with the first embodiment introduced herein, in accordance with various aspects and embodiments of the subject disclosure. FIG. 4 includes, "HARQ Feedback List" 402, "While t<T" 404, "Send List Of Preferred Slots S" 406, "If H[t]==ACK?" 408, "Add t To The List Of Preferred Slots S" 410, and "t=t+1" 412. FIG. 5 illustrates an example HARQ feedback list, in accordance with various aspects and embodiments of the subject disclosure.

The first embodiment can conduct HARQ-based interference avoidance. In such an embodiment, a controller, e.g., controller 210, can be connected to one cell or a subset of interfering neighboring cells. The controller 210 can utilize HARQ feedback on each slot over an immediate previous time window of a predetermined duration, e.g., X ms. The HARQ feedback can be originally transmitted by a UE to a serving cell hosting the scheduler 220.

FIG. 4 illustrates controller processing for intercell interference avoidance. At 402, the controller 210 can receive a HARQ feedback list H reported by the scheduler 220, e.g. a HARQ feedback list such as illustrated in FIG. 5. The HARQ feedback list can contain feedback (i.e. ACK/NACK) received from a UE at a serving cell over the physical uplink control channel (PUCCH) or physical uplink scheduling channel (PUSCH). The HARQ feedback list can indicate whether downlink data sent on a physical downlink scheduling channel (PDSCH) was correctly decoded or not. The HARQ feedback list can be reported to the controller 210 by the scheduler 220, after processing UE feedback received from the UE, as shown in FIG. 5.

At 404, the controller 210 iterates over all entries in the HARQ feedback list, where each entry corresponds to a HARQ feedback value in a downlink slot index t. At 408, IF an entry at slot t is ACK, then this slot has less interference, and the UE was able to correctly decode the DL information. As such, the slot index t can be added, at 410, to the list of preferred slots S. Otherwise, the slot can be skipped via 412, and a next one is processed. The controller 210 can continue until the end of HARQ feedback list is reached, and at 406, the controller 210 can forward the prepared list S to the scheduler 220.

Figure 6:
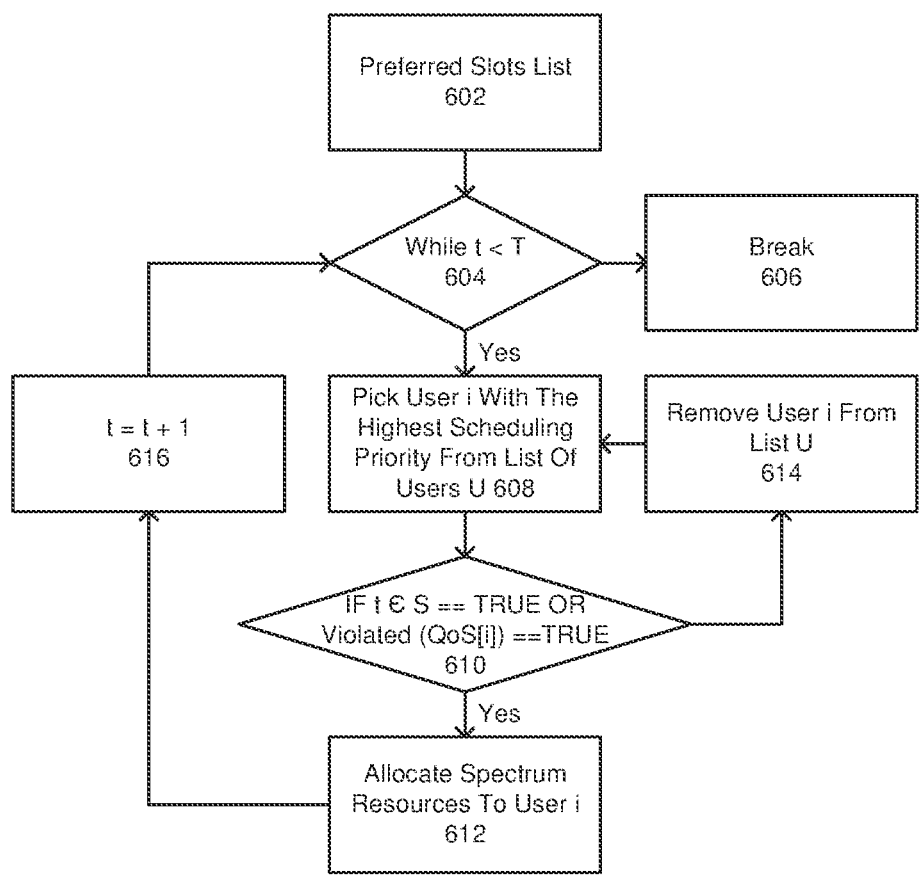
FIG. 6 is a flow diagram illustrating example processing operations that can be performed by a scheduler in accordance with the first embodiment introduced herein, in accordance with various aspects and embodiments of the subject disclosure.

FIG. 6 is a flow diagram illustrating example processing operations that can be performed by a scheduler in accordance with the first embodiment introduced herein, in accordance with various aspects and embodiments of the subject disclosure. FIG. 6 includes, "Preferred Slots List" 602, "While t<T" 604, "Break" 606, "Pick User i With The Highest Scheduling Priority From List Of Users U" 608, "IF t∈S == TRUE OR Violated (QoS[i])== TRUE" 610, "Allocate Spectrum Resources To User I" 612, "Remove User i From List U" 614, and "t=t+1" 616.

At 602, the scheduler 220 can receive a preferred slots list S from the controller 210. At 604, the scheduler 604 can iterate over all entries in list S, where each entry corresponds to a HARQ feedback at a downlink slot index t. At 606, the UE i with the highest scheduling priority can be popped from a UE list U. At 610, IF the value at slot index t for user i is TRUE, the available spectrum resources can be allocated to the UE at 612, and the process can move to a next slot index via operation 616. Otherwise, the UE can be removed from the UE list U at 614, and a UE with a next highest scheduling priority can be selected at 608. The scheduler algorithm can continue until the end of the preferred slots list is reached, and then break at 606.

Figure 7:
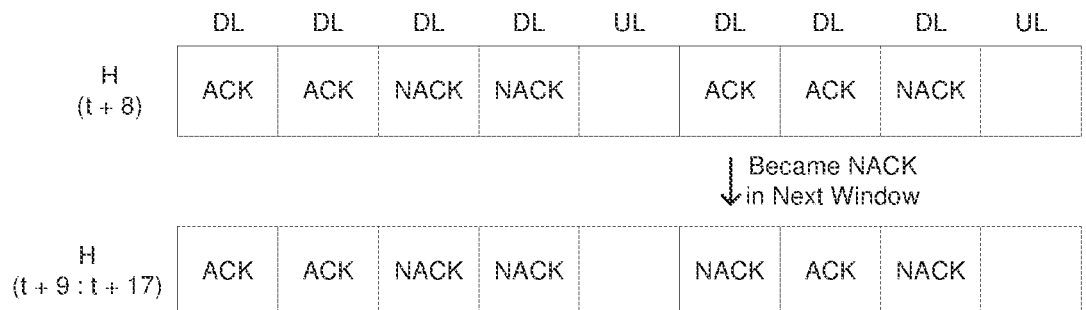
FIG. 7 illustrates example HARQ feedback lists received over two consecutive measurement windows in order to illustrate processing operations that can be performed by a controller in accordance with the second embodiment introduced herein, in accordance with various aspects and embodiments of the subject disclosure.

FIG. 7 illustrates example HARQ feedback lists received over two consecutive measurement windows in order to illustrate processing operations that can be performed by a controller in accordance with the second embodiment introduced herein, in accordance with various aspects and embodiments of the subject disclosure. In the second embodiment, the traffic of neighboring cells may be more dynamic and thus HARQ feedback lists may change over each window as illustrated in FIG. 7. Thus, the controller 210 can be configured to store a history of the HARQ feedback list received in previous measurements and uses the history when calculating preferred slots.

Example processing steps performed by the controller 210 according to the second embodiments can be similar to the operations illustrated in FIG. 4, with some differences. As in operation 402, a HARQ feedback list H can be reported by the scheduler 220. The HARQ feedback list can contain the feedback (i.e. ACK/NACK) received from a UE at the serving cell over the PUCCH or PUSCH, and the HARQ feedback list can indicate whether the downlink data sent on the PDSCH was correctly decoded or not. FIG. 7 illustrates an example of HARQ feedback list, which can be reported by a scheduler 220 after processing the feedback received from a UE. The controller 210 can iterate over all entries in the HARQ feedback list, where each entry corresponds to the HARQ feedback value in a downlink slot index t. IF the entry in slot t is ACK, then this slot has less interference, and the UE was able to correctly decode the DL information. As such, the score for slot index t can be increased: S[t]:=S[t]+1. Otherwise, the score for a corresponding slot index can be penalized. The controller 210 can continue until the end of HARQ feedback list is reached, and the list with slot scores S can be forwarded to the scheduler 220.

Figure 8:
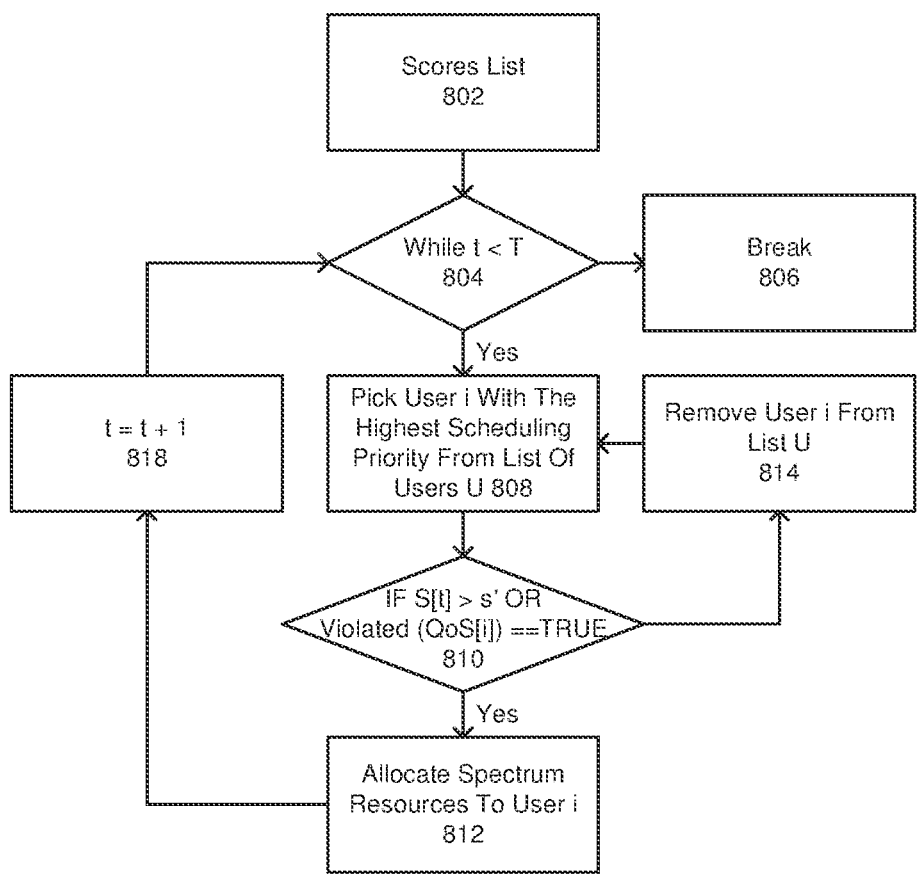
FIG. 8 is a flow diagram illustrating example processing operations that can be performed by a scheduler in accordance with the second embodiment introduced herein, in accordance with various aspects and embodiments of the subject disclosure.

FIG. 8 is a flow diagram illustrating example processing operations that can be performed by a scheduler in accordance with the second embodiment introduced herein, in accordance with various aspects and embodiments of the subject disclosure. FIG. 8 includes, "Preferred Slots List" 802, "While t<T" 804, "Break" 806, "Pick User i With The Highest Scheduling Priority From List Of Users U" 808, "IF S[t]>s' OR Violated (QoS[i])==TRUE" 710, "Allocate Spectrum Resources To User I" 812, "Remove User i From List U" 814, and "t=t+1" 816.

At 802, the scheduler 220 can receive a scores list S from the controller 210. Each item in the list can represent a HARQ feedback-based score for a UE at the serving cell, indicating which slots are more likely to result in correctly decoded downlink data. At 804, the scheduler 220 iterates over all entries in list S, where each entry corresponds to the HARQ feedback-based score associated with the downlink slot index t. At 808, the user i with the highest scheduling priority can be popped from users list U. At 810, IF the score at slot index t for user i exceeds a preset threshold s', the available spectrum resources can be allocated to the user at 812. Otherwise, at 814 the user can be removed and, at 808, a user with a next highest scheduling priority can be checked against the score threshold. The scheduler 220 can continue via operation 818 until the end of HARQ feedback-based score list is reached, and then break 806.

Figures 9, 10, 11:
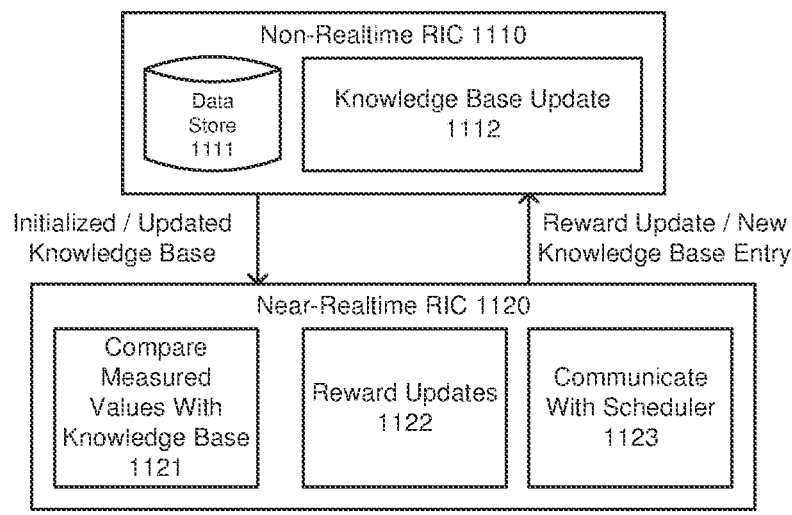
FIG. 9 illustrates an example baseline knowledge base for RSRP, RSRQ and expected MCS, in accordance with various aspects and embodiments of the subject disclosure.
FIG. 10 illustrates an example real-time knowledge base for a slot pattern and its reward under different network states, in accordance with various aspects and embodiments of the subject disclosure.
FIG. 11 illustrates an example controller configured for use with a knowledge base for RSRP, RSRQ and expected MCS, in accordance with various aspects and embodiments of the subject disclosure.
Figure 12:
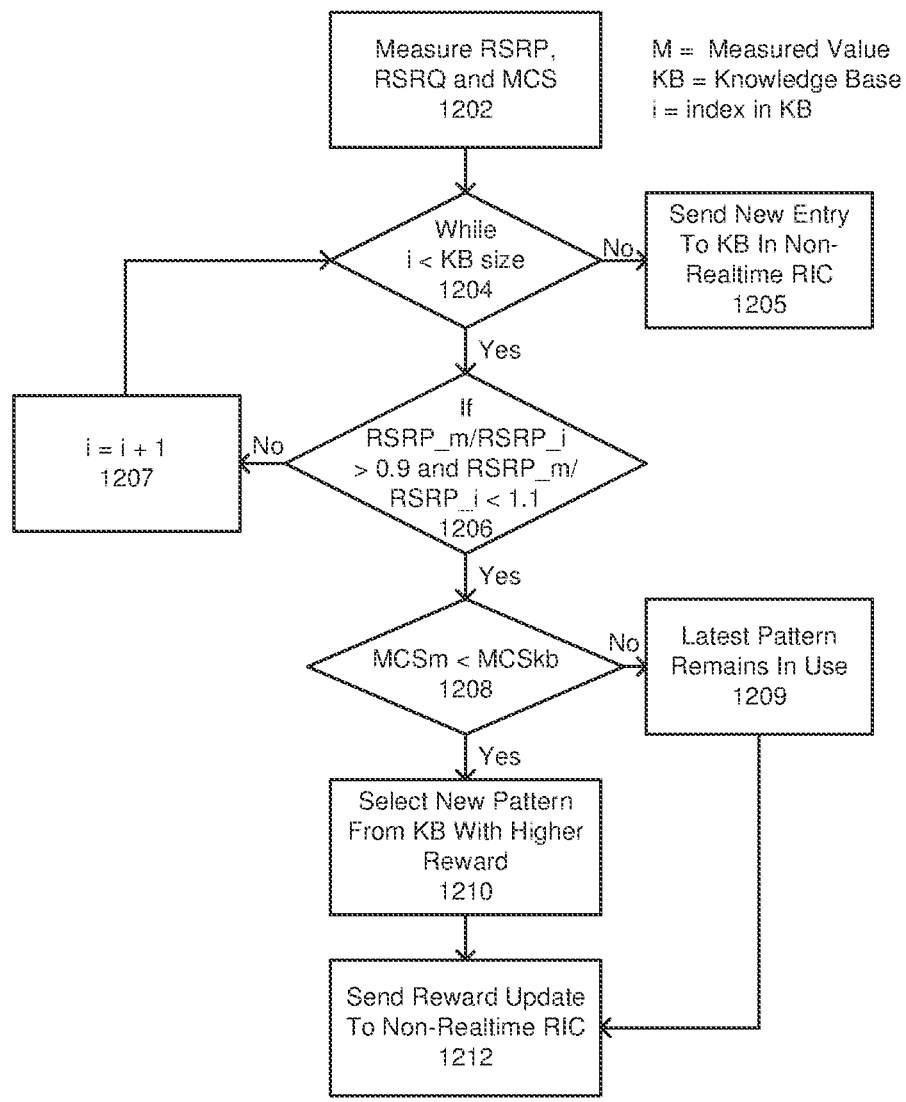
FIG. 12 is a flowchart illustrating example operations of the controller introduced in FIG. 11, in accordance with various aspects and embodiments of the subject disclosure.

FIG. 9, FIG. 10, FIG. 11, and FIG. 12 illustrate the third embodiment according to this disclosure. FIG. 9 illustrates an example baseline knowledge base for RSRP, RSRQ and expected MCS; FIG. 10 illustrates an example real-time knowledge base for a slot pattern and its reward under different network states; FIG. 11 illustrates an example controller configured for use with a knowledge base for RSRP, RSRQ and expected MCS; and FIG. 12 is a flowchart illustrating example operations of the controller introduced in FIG. 11; all in accordance with various aspects and embodiments of the subject disclosure.

The third embodiment can rely on defined KPIs such as RSRP, RSRQ, and the MCS to identify whether intercell interference is a cause of performance degradation or not. The controller illustrated in FIG. 11 can evaluate a set of potential slot patterns under different network conditions and can record a reward value that reflects how optimal a slot pattern is for each network condition.

In the case of interference: 1) the controller illustrated in FIG. 11 can select a new slot pattern, and 2) a reward of a last used slot pattern can be updated. Such embodiments can be beneficial when an explicit HARQ feedback list is not available due to memory or interface limitations and can also help to identify cases where low UE throughput is due to poor coverage. The third embodiment can include an O-RAN compliant architecture in which the controller illustrated in FIG. 11 can be fully hosted in a non-real time RIC, in a near-real time RIC, or distributed among both.

In an example, the controller illustrated in FIG. 11 can maintain the following two types of knowledge base: A baseline knowledge base such as depicted in FIG. 9, and a real time knowledge base such as depicted in FIG. 10. The baseline knowledge base can be provided to the controller by a network operator. Information can be collected using offline simulation or drive tests to compute expected values of MCS under each RSRP and RSRQ values. The baseline knowledge base can be used to detect interference.

The real time knowledge base can be created by the controller illustrated in FIG. 11. A set of slot patterns can represent a set of possible actions for the network to apply. The knowledge base can assume that there exist m possible unique slot patterns that can be recommended to the scheduler. The set of possible patterns can be either based on operator input or created by the controller according to some heuristics (e.g., all the binary permutations of length L, where L is the size of the list). For each action, a corresponding network state can be represented as a set of an RSRP and an RSRQ value. The knowledge base can assume that there are n possible unique sets of RSRP and RSRQ. These possible values can be either based on drive test data from the operator or collected from UEs. The states and actions can be associated with a reward value represented by a network KPI (e.g. cell throughput or user throughput).

The controller illustrated in FIG. 11 comprises a non-real time RIC 1110 and a near-real time RIC 1120. The non-real time RIC 1110 comprises a data store 1111 and a knowledge base update 1112. The near-real time RIC 1120 comprises "Compare Measured Values with Knowledge Base" 1121, "Reward Updates" 1122, and "Communicate with Scheduler" 1123. The non-real time RIC 1110 can send an initialized or updated knowledge base to the near-real time RIC 1120, and the near-real time RIC 1120 can send a reward update/new knowledge base entry to the non-real time RIC 1110.

The non-real time RIC 1110 can be configured to create a knowledge base of RSRP/RSRQ and expected MCS data. The non-real time RIC 1110 can furthermore create a set of preferred slot patterns, and initialize their scores (e.g., throughput or average MCS) to zero. The non-real time RIC 1110 can send the knowledge base to near-real time RIC 1120, and the non-real time RIC 1110 can receive updates from near-real time RIC on the rewards of the knowledge base.

In some embodiments, the near-real time RIC 1120 can be configured to perform the operations illustrated in FIG. 12. At 1202, the near-real time RIC 1120 can measure RSRP, RSRQ and MCS, and compare the measured MCS against the expected values in the knowledge base under such network conditions (RSRP and RSRQ). IF MCS is lower than expected at operation 1208, then high interference can be assumed, and at operation 1210 the near-real time RIC 1120 can select a new pattern from the knowledge base that has higher reward under the current network conditions. At operation 1212, the near-real time RIC 1120 can send a reward update to the non-real time RIC 1110. ELSE, i.e., when MCS is close to the expected value, then low interference can be assumed, and the latest recommended pattern can remain in use at 1209. Optionally, the reward can be updated if it is above the latest recorded value in the knowledge base.

At 1207, 1204, and 1206, the near-real time RIC 1120 can continue iterating doing the above until the end of the knowledge base is reached, which means that no matching values were found. In this case, at 1205, a new entry can be sent to the non-real time RIC 1110 to be added.

Scheduler processing in connection with the third embodiment can be generally similar to the processing illustrated in FIG. 6. The scheduler can receive a scores list S of preferred slots from the controller. The scheduler can iterate over all entries in list S. A UE i with a highest scheduling priority can be popped from a UE list U. IF the value at slot index t for UE i is TRUE, the available spectrum resources can be allocated to the UE. Otherwise, the UE with the next highest scheduling priority can be checked. The scheduler can continue until the end of a preferred slots list is reached.

Figure 13:
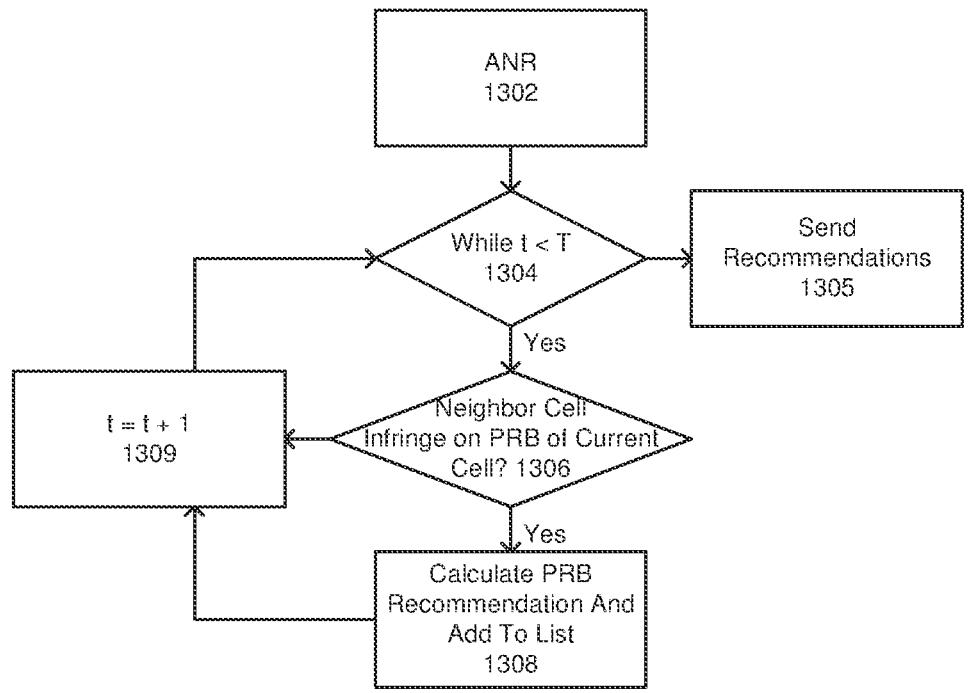
FIG. 13 illustrates example operations performed by a controller, in accordance with various aspects and embodiments of the subject disclosure.
Figure 14:
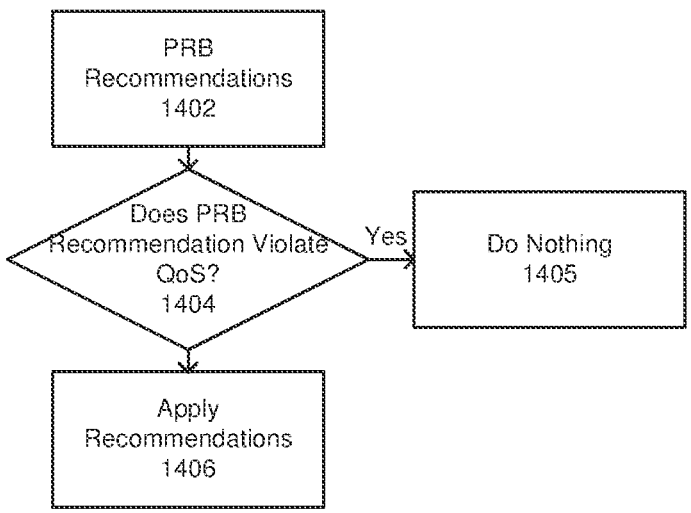
FIG. 14 illustrates example operations performed by a scheduler, in accordance with various aspects and embodiments of the subject disclosure.

FIG. 13, FIG. 14, FIG. 15, and FIG. 16 illustrate the fourth embodiment according to this disclosure. FIG. 13 illustrates example operations performed by a controller; FIG. 14 illustrates example operations performed by a scheduler; FIG. 15 illustrates an example controller input based on automatic neighbor relations (ANR); and FIG. 16 illustrates example measured PRB utilization and recommended actions from a controller; all in accordance with various aspects and embodiments of the subject disclosure.

The fourth embodiment can be configured for centralized and UE-aware inter-cell interference avoidance. The controller can be connected to all neighboring cells of a set of neighboring cells in a network. The controller can utilize the PRB utilization of each cell as well as neighboring cell data from ANR modules. The ANR information can be originally transmitted by the UE to the serving cell hosting the scheduler.

As illustrated in FIG. 13, at 1302, the controller can receive the ANR reported by the scheduler. The ANR list can contain the neighboring cells near a UE. An example ANR list is depicted in FIG. 15. The list can be reported by a DU, after processing feedback received from the UE. At 1304 and 1309, the controller can iterate over all entries in the ANR list, where each entry corresponds to a neighboring cell. At 1306, IF the neighboring cells have an overlap in PRB with the current cell used by the UE, the controller can calculate a PRB recommendation at 1308 and add it to a PRB utilization list such as the bold, underlined entries illustrated in FIG. 16. At 1305, the controller can send PRB recommendations such as illustrated in FIG. 16 to the DU, wherein the PRB recommendations comprise new PRB values for each cell to reduce potential interference. Otherwise, no change is needed.

As illustrated in FIG. 14, at 1402, the scheduler can receive a PRB recommendations list (see FIG. 16) from the controller. At 1404, the scheduler can check if the PRB recommendations list violates QoS requirements. IF yes, then do nothing at 1405. Otherwise, the scheduler can apply recommendations at 1406.

Figure 17:
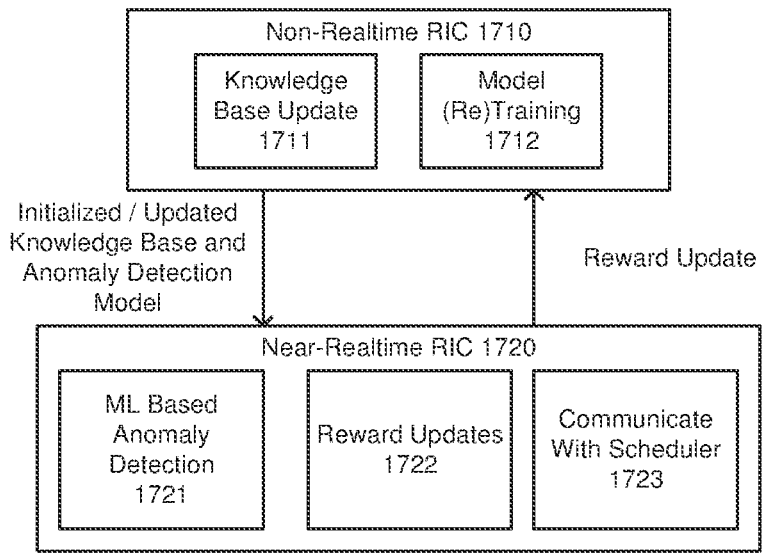
FIG. 17 illustrates an example controller architecture, in accordance with various aspects and embodiments of the subject disclosure.
Figure 18:
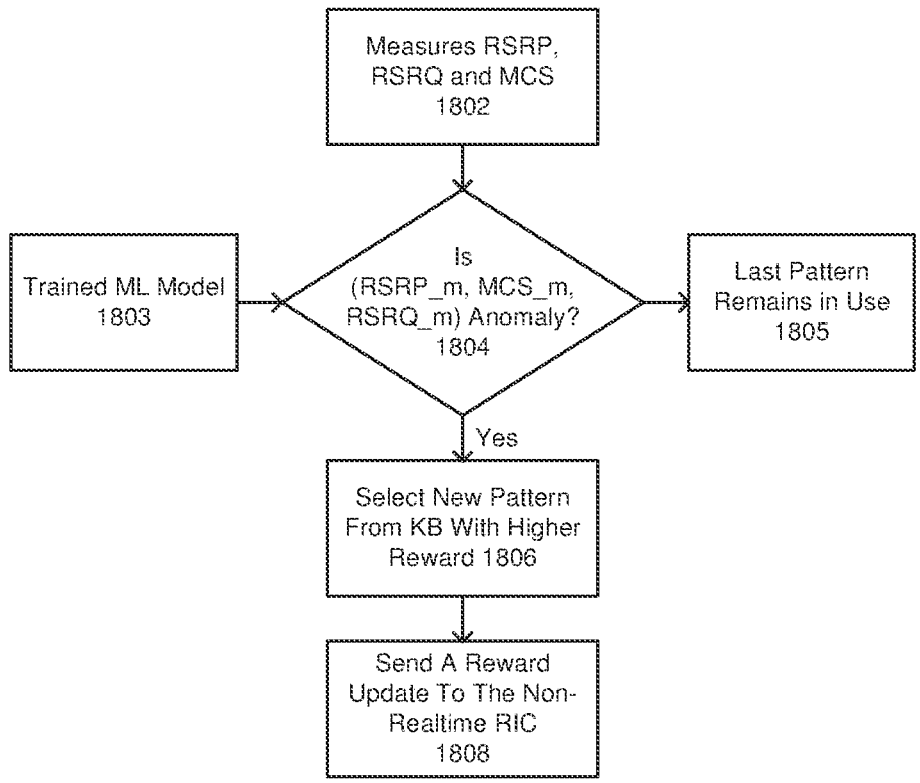
FIG. 18 illustrates example operations performed by a controller, in accordance with various aspects and embodiments of the subject disclosure.

FIG. 17 and FIG. 18 illustrate the fifth embodiment according to this disclosure. FIG. 17 illustrates an example controller architecture and FIG. 18 illustrates example operations performed by a controller, in accordance with various aspects and embodiments of the subject disclosure.

The fifth embodiment can be configured for learning-based intercell interference avoidance with ML-based interference detection. The fifth embodiment can be a variant of the third embodiment, where interference can be detected using machine learning instead of rule-based comparisons. A model can be trained in the non-real time RIC on RSRP, RSRQ and MCS data generated from simulations and drive tests; then the trained model can be passed to the near-real time RIC for runtime inference. The controller can evaluate a set of potential slot patterns under different network conditions and can record a reward value that reflects how optimal the slot pattern is for each network condition. In the case of interference: 1) a new slot pattern can be selected, and 2) the reward of the latest used slot pattern can be updated.

The controller can maintain the two types of knowledge base: a baseline knowledge base and a real time knowledge base. The baseline knowledge base can be provided by the operator to the controller. Information can be collected using offline simulation or drive tests to train ML models for interference detection. The real time knowledge base can be created by the controller. A set of slot patterns can represent the set of possible actions for the network to apply. The controller can assume that there exist m possible unique slot patterns that can be recommended to the scheduler. The set of possible patterns can be either based on operator input or created by the controller according to heuristics (e.g., all the binary permutations of length L, where L is the size of the list).

For each action, a corresponding network state can be represented as a set of an RSRP and an RSRQ value. Contrary to the third embodiment, no assumptions need be made about the possible RSRP and RSRQ values. The states and actions can be associated with a reward value represented by a network KPI (e.g. cell throughput or user throughput).

With reference to FIG. 17 and FIG. 18, the controller can be hosted either in the non-real time RIC 1710 or in the near-real time RIC 1720. To avoid high complexity if fully deployed in the near-real time RIC 1710 and low optimization speed if deployed in the non-real time RIC 1720, the controller can be split as follows. In the non-real time RIC 1710, model (re)training 1712 can create a set of preferred slot patterns, and initialize their scores (e.g., throughput or average MCS) to zero. The non-real time RIC 1710 can also host knowledge base update 1711. The non-real time RIC 1710 can send the trained model to the near-real time RIC

1720, and can receive updates from near-real time RIC 1720 on the rewards of the knowledge base and new data for model retraining.

The near-real time RIC 1720 can be configured to measure RSRP, RSRQ and MCS, at operation 1802, and at 1803/1804, the near-real time RIC 1720 can use the ML model to classify each as normal or interference. IF interference is detected, then at 1806 the controller can select a new pattern from the knowledge base that has higher reward under current network conditions, and at 1808, the controller can send a reward update to the non-real time RIC 1710. ELSE, i.e. model can classify values as normal, and the latest recommended pattern can remain in use at 1805. Optionally, the reward can be updated if it is above the latest recorded value in the knowledge base.

A scheduler for use with the fifth embodiment can follow operations similar to those illustrated in FIG. 6. The scheduler can receive a scores list S of preferred slots from the controller. The scheduler can iterate over all entries in list S. The UE i with the highest scheduling priority can be popped from users list U. IF the value at slot index t for UE i is TRUE, the available spectrum resources can be allocated to the UE. Otherwise, the UE with the next highest scheduling priority can be checked. The scheduler can continue until the end of the preferred slots list is reached.

Figure 19:
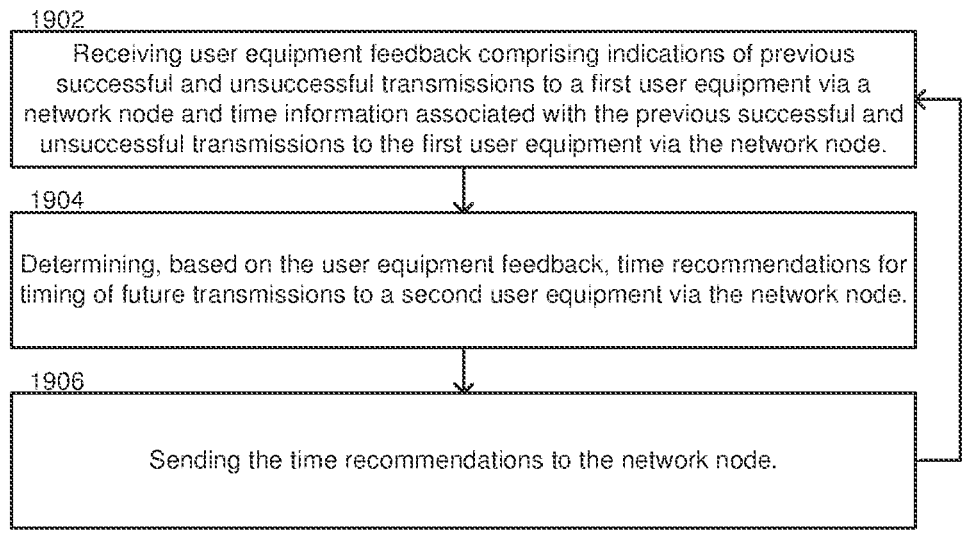
FIG. 19 is a flow diagram representing example operations of network equipment comprising a controller, in accordance with various aspects and embodiments of the subject disclosure.

FIG. 19 is a flow diagram representing example operations of network equipment comprising a controller, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 19 can be performed, for example, by network equipment comprising controller, such as the controller 210 illustrated in FIG. 2. Example operation 1902 comprises receiving, by network equipment comprising a processor, user equipment feedback, the user equipment feedback comprising indications of previous successful and unsuccessful transmissions to a first user equipment via a network node 220, and time information associated with the previous successful and unsuccessful transmissions to the first user equipment via the network node 220. The time information can indicate time slots of the previous successful and unsuccessful transmissions to the first user equipment via the network node, e.g., HARQ information, RSRP information, or other user equipment feedback information disclosed herein.

Example operation 1904 comprises determining, by the network equipment, based on the user equipment feedback, time recommendations for timing of future transmissions to a second user equipment via the network node 220. The time recommendations can comprise time slot recommendations for the timing of the future transmissions to the second user equipment via the network node 220. The time recommendations can comprise preferred/priority time slots for the future transmissions, or non-preferred/non-priority time slots for the future transmissions (having a lower priority than the priority time slots), or both. In some embodiments, the first user equipment and the second user equipment can be located in a subregion of a geographic region served by the network node 220, for example a sub-region that is associated with a generally similar/homogeneous amount of interference over the sub-region. Determining the time recommendations based on the user equipment feedback can comprise applying machine learning to the user equipment feedback in order to learn the time recommendations. Determining the time recommendations can be based on the user equipment feedback as well as, optionally, neighbor node resource utilization data, wherein the neighbor node resource utilization data defines radio frequency resource utilization by a neighbor node that is a neighbor of the network node 220.

Example operation 1906 comprises sending, by the network equipment, the time recommendations to the network node 220. An arrow returning to operation 1902 indicates that receiving the user equipment feedback, determining the time recommendations, and sending the time recommendations to the network node 220 can be performed in a repeating cycle having a cycle frequency.

Figure 20:
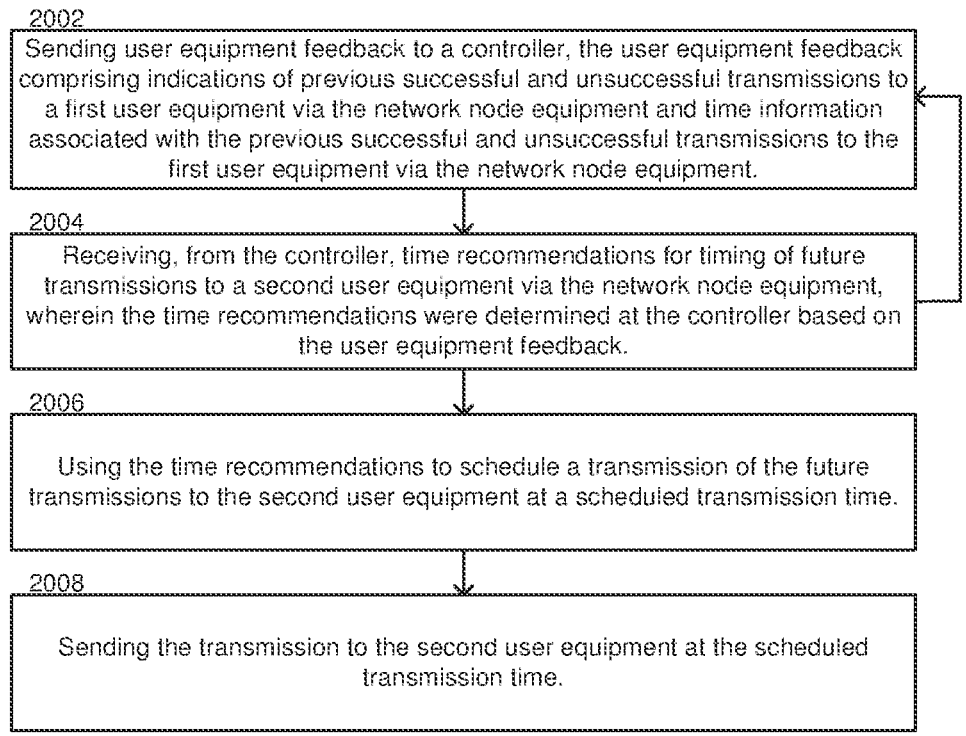
FIG. 20 is a flow diagram representing example operations of network node equipment comprising a scheduler, in accordance with various aspects and embodiments of the subject disclosure.

FIG. 20 is a flow diagram representing example operations of network node equipment comprising a scheduler, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 20 can be performed, for example, by network node equipment comprising scheduler, such as the scheduler 220 illustrated in FIG. 2. Example operation 2002 comprises sending user equipment feedback to a controller 210, the user equipment feedback comprising indications of previous successful and unsuccessful transmissions to a first user equipment via the network node equipment, and time information associated with the previous successful and unsuccessful transmissions to the first user equipment via the network node equipment. The time information can indicate time slots of the previous successful and unsuccessful transmissions to the first user equipment via the network node equipment. The user equipment feedback can comprise, e.g., HARQ information, RSRQ information, or other information described herein.

Example operation 2004 comprises receiving, from the controller 210, time recommendations for timing of future transmissions to a second user equipment via the network node equipment, wherein the time recommendations were determined at the controller 210 based on the user equipment feedback sent pursuant to operation 2002. In some embodiments, the first user equipment and the second user equipment can be located in a subregion of a geographic region served by the network node equipment, e.g., the recommendations are for second UEs that have entered a subregion previously occupied by the first UEs. In some embodiments, the second UEs can comprise at least some of the same UEs as the first UEs.

The time recommendations can comprise time slot recommendations for the timing of the future transmissions. The time recommendations can comprise, e.g., first time slots having a first priority (preference) for the future transmissions or second time slots having a second priority (preference) for the future transmissions, and the first priority can indicate a higher priority for the first time slots than the second priority for the second time slots.

In some embodiments, sending the user equipment feedback via operation 2002 and receiving the time recommendations via operation 2004 can be performed in a repeating cycle having a cycle frequency, as indicated by the arrow returning from operation 2002 to operation 2004. In some embodiments, sending the user equipment feedback to the controller can be performed in response to a request from the controller.

Example operation 2006 comprises using the time recommendations to schedule a transmission of the future transmissions to the second user equipment at a scheduled transmission time. Example operation 2008 comprises sending the transmission to the second user equipment at the scheduled transmission time.

Figure 21:
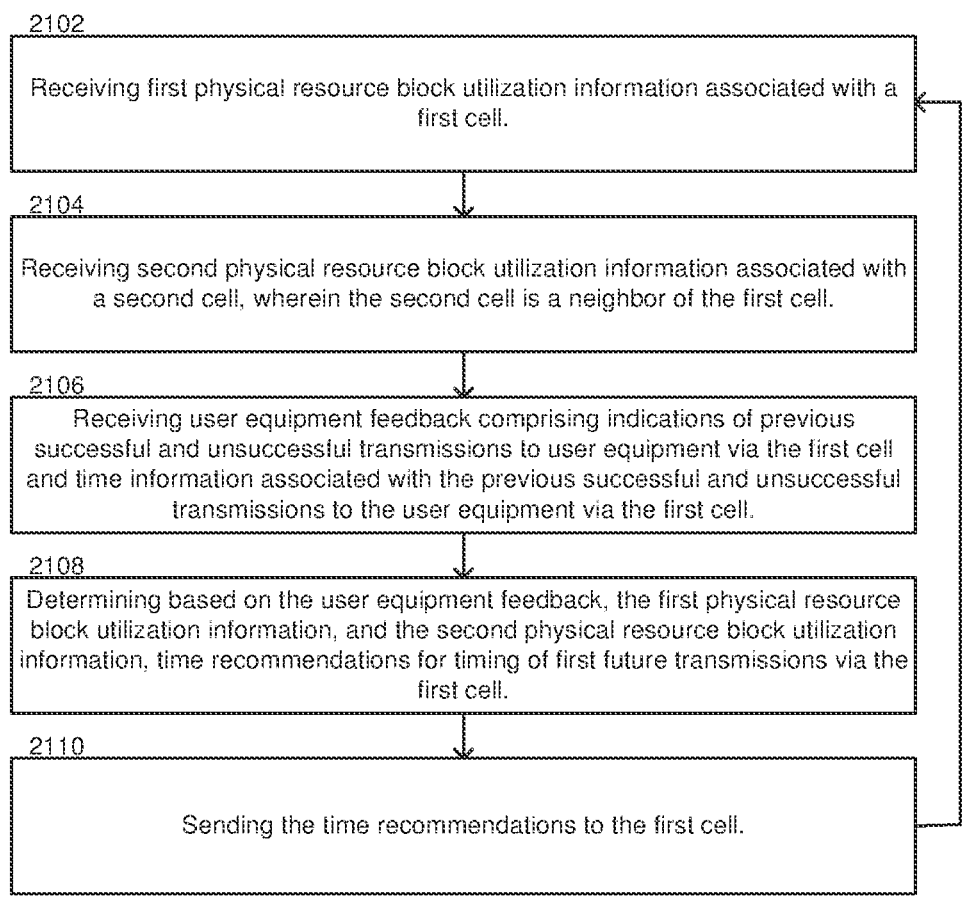
FIG. 21 is a flow diagram representing another set of example operations of network equipment comprising a controller, in accordance with various aspects and embodiments of the subject disclosure.

FIG. 21 is a flow diagram representing another set of example operations of network equipment comprising a controller, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 21 can be performed, for example, by network equipment comprising controller, such as the controller 111 illustrated in FIG. 1. Example operation 2102 comprises receiving first physical resource block (PRB) utilization information associated with a first cell, e.g., from network node 131. Example operation 2104 comprises receiving second PRB utilization information associated with a second cell, e.g., from network node 141, wherein the second cell is a neighbor of the first cell. Example operation 2106 comprises receiving user equipment feedback, e.g. UE feedback 121, the user equipment feedback can comprise indications of previous successful and unsuccessful transmissions to user equipment via the first cell and time information associated with the previous successful and unsuccessful transmissions to the user equipment via the first cell. For example, the UE feedback 121 can comprise HARQ information as well as other feedback information described herein.

Example operation 2108 comprises determining based on the user equipment feedback 121, the first physical resource block utilization information, and the second physical resource block utilization information, time recommendations for timing of first future transmissions via the first cell 131. In some embodiments, the time recommendations can comprise first time recommendations, and second time recommendations can also be determined for timing of second future transmissions via the second cell 141. In some embodiments, the user equipment can be located in a subregion of a geographic region served by the first cell 131, and the time recommendations can be for timing of the first future transmissions in the subregion. For example, the subregions can be the region of overlap of service areas 130 and 140, illustrated in FIG. 1. In some embodiments, the time recommendations can comprise preferred and/or nonpreferred time slots for the first future transmissions, and the first cell 131 can be configured to avoid the nonpreferred time slots, and to favor use of the preferred timeslots. Example operation 2110 comprises sending the time recommendations to the first cell 131. The second time recommendations can also be sent to the second cell 141.

Figure 22:
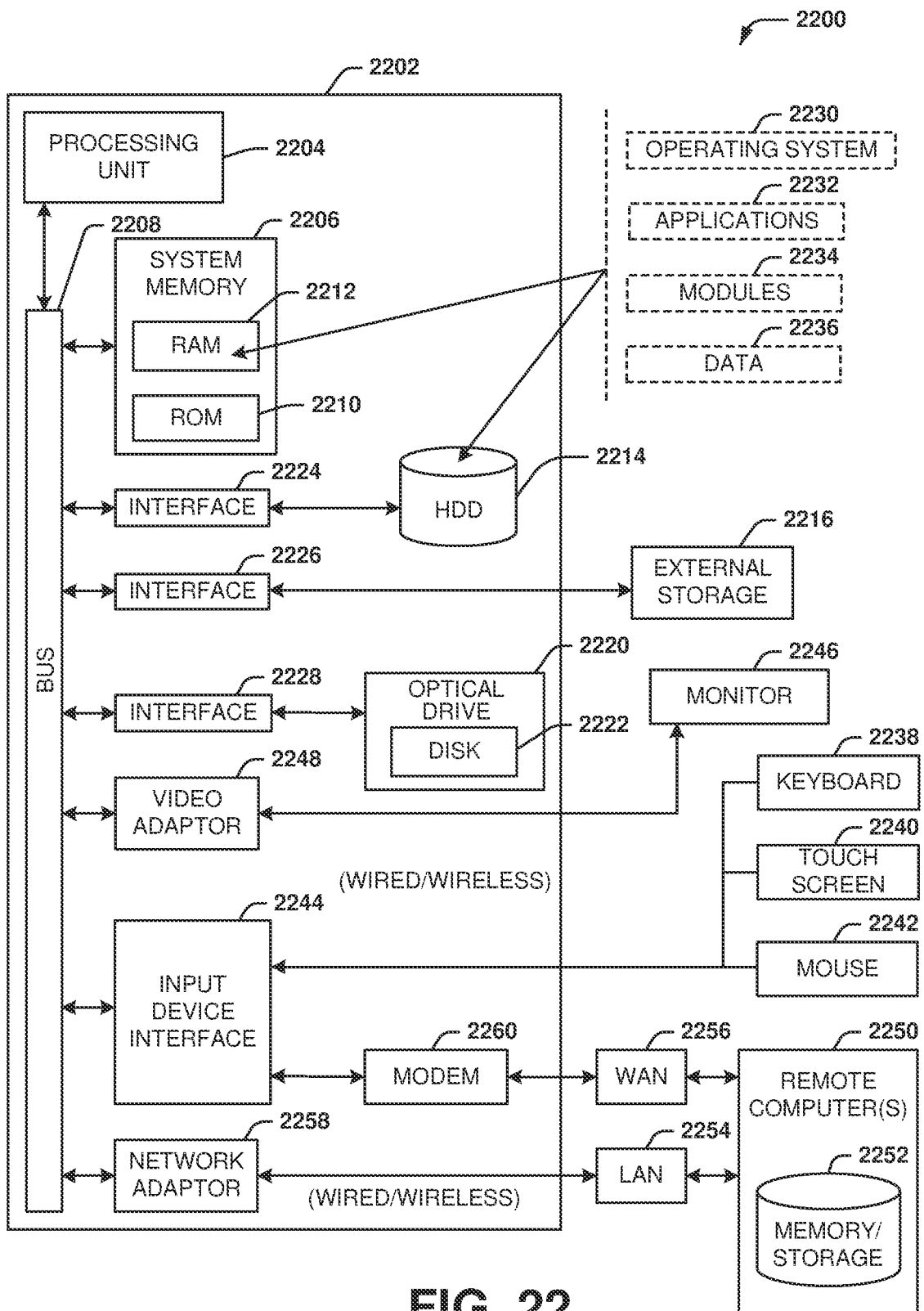
FIG. 22 is a block diagram of an example computer that can be operable to execute processes and methods in accordance with various aspects and embodiments of the subject disclosure.

FIG. 22 is a block diagram of an example computer that can be operable to execute processes and methods in accordance with various aspects and embodiments of the subject disclosure. The example computer can be adapted to implement, for example, any of the various network equipment described herein.

FIG. 22 and the following discussion are intended to provide a brief, general description of a suitable computing environment 2200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22, the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the computer 2202, such as during startup. The RAM 2212 can also include a high-speed RAM such as static RAM for caching data.

The computer 2202 further includes an internal hard disk drive (HDD) 2214 (e.g., EIDE, SATA), one or more external storage devices 2216 (e.g., a magnetic floppy disk drive (FDD) 2216, a memory stick or flash drive reader, a memory card reader, etc.) and an optical disk drive 2220 (e.g., which can read or write from a CD-ROM disc, a DVD, a BD, etc.). While the internal HDD 2214 is illustrated as located within the computer 2202, the internal HDD 2214 can also be configured for external use in a suitable chassis (not shown). Additionally, while not shown in environment 2200, a solid-state drive (SSD) could be used in addition to, or in place of, an HDD 2214. The HDD 2214, external storage device(s) 2216 and optical disk drive 2220 can be connected to the system bus 2208 by an HDD interface 2224, an external storage interface 2226 and an optical drive interface 2228, respectively. The interface 2224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various commercially available operating systems or combinations of operating systems.

Computer 2202 can optionally comprise emulation technologies. For example, a hypervisor (not shown) or other intermediary can emulate a hardware environment for operating system 2230, and the emulated hardware can optionally be different from the hardware illustrated in FIG. 22. In such an embodiment, operating system 2230 can comprise one virtual machine (VM) of multiple VMs hosted at computer 2202. Furthermore, operating system 2230 can provide runtime environments, such as the Java runtime environment or the .NET framework, for applications 2232. Runtime environments are consistent execution environments that allow applications 2232 to run on any operating system that includes the runtime environment. Similarly, operating system 2230 can support containers, and applications 2232 can be in the form of containers, which are lightweight, standalone, executable packages of software that include, e.g., code, runtime, system tools, system libraries and settings for an application.

Further, computer 2202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2208, but can be connected by other interfaces, such as a parallel port, an IEEE 1394 serial port, a game port, a USB port, an IR interface, a BLUETOOTH® interface, etc.

A monitor 2246 or other type of display device can be also connected to the system bus 2208 via an interface, such as a video adapter 2248. In addition to the monitor 2246, a computer typically includes other peripheral output devices (not shown), such as speakers, printers, etc.

The computer 2202 can operate in a networked environment using logical connections via wired and/or wireless communications to one or more remote computers, such as a remote computer(s) 2250. The remote computer(s) 2250 can be a workstation, a server computer, a router, a personal computer, portable computer, microprocessor-based entertainment appliance, a peer device or other common network node, and typically includes many or all the elements described relative to the computer 2202, although, for purposes of brevity, only a memory/storage device 2252 is illustrated. The logical connections depicted include wired/wireless connectivity to a local area network (LAN) 2254 and/or larger networks, e.g., a wide area network (WAN) 2256. Such LAN and WAN networking environments are commonplace in offices and companies, and facilitate enterprise-wide computer networks, such as intranets, all of which can connect to a global communications network, e.g., the internet.

When used in a LAN networking environment, the computer 2202 can be connected to the local network 2254 through a wired and/or wireless communication network interface or adapter 2258. The adapter 2258 can facilitate wired or wireless communication to the LAN 2254, which can also include a wireless access point (AP) disposed thereon for communicating with the adapter 2258 in a wireless mode.

When used in a WAN networking environment, the computer 2202 can include a modem 2260 or can be connected to a communications server on the WAN 2256 via other means for establishing communications over the WAN 2256, such as by way of the internet. The modem 2260, which can be internal or external and a wired or wireless device, can be connected to the system bus 2208 via the input device interface 2244. In a networked environment, program modules depicted relative to the computer 2202 or portions thereof, can be stored in the remote memory/storage device 2252. It will be appreciated that the network connections shown are example and other means of establishing a communications link between the computers can be used.

When used in either a LAN or WAN networking environment, the computer 2202 can access cloud storage systems or other network-based storage systems in addition to, or in place of, external storage devices 2216 as described above. Generally, a connection between the computer 2202 and a cloud storage system can be established over a LAN 2254 or WAN 2256 e.g., by the adapter 2258 or modem 2260, respectively. Upon connecting the computer 2202 to an associated cloud storage system, the external storage interface 2226 can, with the aid of the adapter 2258 and/or modem 2260, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by network equipment comprising a processor, user equipment feedback, wherein the user equipment feedback comprises:
     first indications, for at least one occurrence of a time window that is repeating, of previous successful transmissions to a first user equipment via a network node in respective downlink slots of the time window, and
     second indications, for the at least one occurrence of the time window, of previous unsuccessful transmissions to the first user equipment via the network node in the respective downlink slots of the time window;
   determining, by the network equipment, based on the user equipment feedback, time recommendations for timing of future transmissions to a second user equipment via the network node, wherein the determining comprises, for respective time slots of the time window for the at least one occurrence of the time window:
     adjusting a counter for the time slot based on a first quantity of the previous successful transmissions in the time slot and a second quantity of the previous unsuccessful transmissions in the time slot, and
     determining a recommendation for the time slot based on the counter; and
   sending, by the network equipment, the time recommendations to the network node.

2. The method of claim 1, wherein the user equipment feedback further comprises at least one of hybrid automatic repeat request information or reference signal received quality information.

3. The method of claim 2, wherein determining the time recommendations is further based on the at least one of the hybrid automatic repeat request information or the reference signal received quality information.

4. The method of claim 1, wherein the first user equipment and the second user equipment are located in a subregion of a geographic region served by the network node.

5. The method of claim 1, wherein receiving the user equipment feedback, determining the time recommendations, and sending the time recommendations to the network node are performed in a repeating cycle having a cycle frequency.

6. The method of claim 1, wherein the time recommendations comprise at least one of priority time slots for the future transmissions or non-priority time slots for the future transmissions having a lower priority than the priority time slots.

7. The method of claim 1, wherein determining the time recommendations based on the user equipment feedback comprises applying machine learning to the user equipment feedback in order to learn the time recommendations.

8. The method of claim 1, wherein determining the time recommendations is based on the user equipment feedback and neighbor node resource utilization data, and wherein the neighbor node resource utilization data defines radio frequency resource utilization by a neighbor node that is a neighbor of the network node.

9. Network equipment, comprising:
   a memory that stores computer executable components; and
   a processor that executes at least one of the computer executable components that:
     receives user equipment feedback, wherein the user equipment feedback comprises:
       first indications, for at least one occurrence of a time window that is repeating, of previous successful transmissions to a first user equipment via a network node in respective downlink slots of the time window, and
       second indications, for the at least one occurrence of the time window, of previous unsuccessful transmissions to the first user equipment via the network node in the respective downlink slots of the time window;
     determines, based on the user equipment feedback, time recommendations for timing of future transmissions to a second user equipment via the network node, wherein the determining comprises, for respective time slots of the time window for the at least one occurrence of the time window:
       adjusting a counter for the time slot based on a first quantity of the previous successful transmissions in the time slot and a second quantity of the previous unsuccessful transmissions in the time slot, and
       determining a recommendation for the time slot based on the counter; and
     sends the time recommendations to the network node.

10. The network equipment of claim 9, wherein the user equipment feedback further comprises at least one of hybrid automatic repeat request information or reference signal received quality information, and wherein determining the time recommendations is further based on the at least one of the hybrid automatic repeat request information or the reference signal received quality information.

11. The network equipment of claim 9, wherein the first user equipment and the second user equipment are located in a subregion of a geographic region served by the network node.

12. The network equipment of claim 9, wherein receiving the user equipment feedback, determining the time recommendations, and sending the time recommendations to the network node are performed in a repeating cycle having a cycle frequency.

13. The network equipment of claim 9, wherein the time recommendations comprise at least one of priority time slots for the future transmissions or non-priority time slots for the future transmissions having a lower priority than the priority time slots.

14. The network equipment of claim 9, wherein determining the time recommendations is further based on neighbor node resource utilization data, and wherein the neighbor node resource utilization data defines radio frequency resource utilization by a neighbor node that is a neighbor of the network node.

15. A non-transitory machine-readable medium, comprising executable instructions that, when executed by a processor, facilitate performance of operations, comprising:

receiving user equipment feedback, wherein the user equipment feedback comprises:
   first indications, for at least one occurrence of a time window that is repeating, of previous successful transmissions to a first user equipment via a network node in respective downlink slots of the time window, and
   second indications, for the at least one occurrence of the time window, of previous unsuccessful transmissions to the first user equipment via the network node in the respective downlink slots of the time window;
determining, based on the user equipment feedback, time recommendations for timing of future transmissions to a second user equipment via the network node, wherein the determining comprises, for respective time slots of the time window for the at least one occurrence of the time window:
   adjusting a counter for the time slot based on a first quantity of the previous successful transmissions in the time slot and a second quantity of the previous unsuccessful transmissions in the time slot, and
   determining a recommendation for the time slot based on the counter; and
sending the time recommendations to the network node.

16. The non-transitory machine-readable medium of claim 15, wherein the user equipment feedback further comprises at least one of hybrid automatic repeat request information or reference signal received quality information, and wherein determining the time recommendations is further based on the at least one of the hybrid automatic repeat request information or the reference signal received quality information.

17. The non-transitory machine-readable medium of claim 15, wherein the first user equipment and the second user equipment are located in a subregion of a geographic region served by the network node.

18. The non-transitory machine-readable medium of claim 15, wherein receiving the user equipment feedback, determining the time recommendations, and sending the time recommendations to the network node are performed in a repeating cycle having a cycle frequency.

19. The non-transitory machine-readable medium of claim 15, wherein the time recommendations comprise at least one of priority time slots for the future transmissions or non-priority time slots for the future transmissions having a lower priority than the priority time slots.

20. The non-transitory machine-readable medium of claim 15, wherein determining the time recommendations is further based on neighbor node resource utilization data, and wherein the neighbor node resource utilization data defines radio frequency resource utilization by a neighbor node that is a neighbor of the network node.

* * * * *